(12) United States Patent
Yamaguchi et al.

(10) Patent No.: US 12,029,962 B2
(45) Date of Patent: Jul. 9, 2024

(54) USER TERMINAL AND SEARCH SYSTEM

(71) Applicant: NTT Communications Corporation, Tokyo (JP)

(72) Inventors: Osamu Yamaguchi, Tokyo (JP); Shinya Kishimoto, Tokyo (JP); Hiroshi Gamou, Koshigaya (JP)

(73) Assignee: NTT Communications Corporation, Tokyo (JP)

( * ) Notice: Subject to any disclaimer, the term of this patent is extended or adjusted under 35 U.S.C. 154(b) by 235 days.

(21) Appl. No.: 17/456,705

(22) Filed: Nov. 29, 2021

(65) Prior Publication Data

US 2022/0080283 A1 Mar. 17, 2022

Related U.S. Application Data

(63) Continuation of application No. PCT/JP2020/022142, filed on Jun. 4, 2020.

(30) Foreign Application Priority Data

Jun. 4, 2019 (JP) ................................. 2019-104521

(51) Int. Cl.
*A63B 71/06* (2006.01)
*A63B 43/00* (2006.01)
(Continued)

(52) U.S. Cl.
CPC .......... *A63B 71/0622* (2013.01); *A63B 43/00* (2013.01); *A63B 57/00* (2013.01);
(Continued)

(58) Field of Classification Search
CPC ..... A63B 71/0622; A63B 43/00; A63B 57/00; A63B 37/0003; A63B 2071/0625;
(Continued)

(56) References Cited

U.S. PATENT DOCUMENTS

| 5,423,549 A | * | 6/1995 | Englmeier | A63B 43/00 |
| | | | | 473/570 |
| 5,626,531 A | * | 5/1997 | Little | A63B 43/00 |
| | | | | 473/353 |

(Continued)

FOREIGN PATENT DOCUMENTS

| AU | 2006246302 B2 | 11/2006 |
| JP | 3-210838 A | 9/1991 |

(Continued)

OTHER PUBLICATIONS

International Search Report dated Jul. 14, 2020 in PCT/JP2020/022142 filed on Jun. 4, 2020, 4 pages (with English Translation).

(Continued)

*Primary Examiner* — Nini F Legesse
(74) *Attorney, Agent, or Firm* — Oblon, McClelland, Maier & Neustadt, L.L.P.

(57) ABSTRACT

A user terminal includes a communication device configured to receive radio waves transmitted from a wireless communication tag provided on a golf ball, an output device configured to output information to a user, and a controller configured to control the output device and output information according to radio waves transmitted from the wireless communication tag provided on a golf ball.

8 Claims, 5 Drawing Sheets

(51) Int. Cl.
*A63B 57/00* (2015.01)
*G01S 1/68* (2006.01)
*A63B 37/00* (2006.01)

(52) U.S. Cl.
CPC ............. *G01S 1/68* (2013.01); *A63B 37/0003* (2013.01); *A63B 2071/0625* (2013.01); *A63B 2071/0655* (2013.01); *A63B 2071/0691* (2013.01); *A63B 2220/12* (2013.01); *A63B 2225/54* (2013.01); *A63B 2225/74* (2020.08)

(58) Field of Classification Search
CPC .... A63B 2071/0655; A63B 2071/0691; A63B 2220/12; A63B 2225/54; A63B 2225/74; A63B 43/004; G01S 1/68; G01S 5/02; G01S 5/0284; G01S 11/06; G01S 2205/08; H04W 4/80
USPC .................................................. 473/407, 409
See application file for complete search history.

(56) References Cited

U.S. PATENT DOCUMENTS

| | | | |
|---|---|---|---|
| 8,002,645 B2* | 8/2011 | Savarese | A63B 24/0021 473/409 |
| 8,172,702 B2* | 5/2012 | Meadows | G01S 19/19 473/407 |
| 8,400,346 B2* | 3/2013 | Hubbard | G01S 13/04 342/195 |
| 9,498,682 B2* | 11/2016 | Luciano, Jr. | A63B 37/0076 |
| 9,927,525 B2* | 3/2018 | Zimmerman | G01S 19/19 |
| 2008/0207357 A1 | 8/2008 | Savarese et al. | |
| 2010/0151955 A1* | 6/2010 | Holden | A63B 24/0021 473/409 |
| 2011/0207553 A1 | 8/2011 | Reid et al. | |
| 2014/0128171 A1* | 5/2014 | Anderson | G01S 19/19 473/199 |
| 2016/0296796 A1* | 10/2016 | Sandel | A63B 24/0021 |
| 2018/0161656 A1* | 6/2018 | Koo | A63B 57/20 |

FOREIGN PATENT DOCUMENTS

| | | | | |
|---|---|---|---|---|
| JP | 2005-081128 A | | 3/2005 | |
| JP | 2006-159311 A | | 6/2006 | |
| JP | 2006-338336 A | | 12/2006 | |
| JP | 2014-217049 A | | 11/2014 | |
| JP | 2014217049 A | * | 11/2014 | |
| JP | 2018-46469 A | | 3/2018 | |
| KR | 10-0754548 B1 | | 9/2007 | |
| WO | WO-2015075108 A1 | * | 5/2015 | ......... A63B 24/0021 |
| WO | WO 2018/203249 A1 | | 11/2018 | |
| WO | WO-2018203249 A1 | * | 11/2018 | ......... A63B 24/0021 |

OTHER PUBLICATIONS

Japanese Office Action dated May 23, 2023 in Japanese Application 2019-104521, (with English translation), 6 pages.
Extended European Search Report dated Jan. 2, 2023, in corresponding European Patent Application No. 20819379.7, 37 pages.
European Office Action dated Oct. 19, 2023 in European Application 20819379.7, 7 pages.
Office Action issued Mar. 7, 2023, in corresponding Japanese Patent Application No. 2019-104521 (with English Translation), citing document 15 therein, 14 pages.

* cited by examiner

| RECEPTION STRENGTH | OUTPUT MODE |
|---|---|
| V1~V2 | X1 |
| V2~V3 | X2 |
| V3~V4 | X3 |
| ⋮ | ⋮ |

261

USER TERMINAL AND SEARCH SYSTEM

The present application is a continuation application of International Application No. PCT/JP2020/022142, filed on Jun. 4, 2020, which claims priority of Japanese Patent Application No. 2019-104521, filed on Jun. 4, 2019, the entire content of which is incorporated herein by reference.

BACKGROUND OF THE INVENTION

Field of the Invention

The present invention relates to a technology for finding a golf ball.

Description of Related Art

A golf player needs to perform various tasks in parallel during play, such as selecting a club, searching for a ball, and managing a score. For this reason, various golf tools have been proposed for the purpose of reducing the workload of a player (for example, refer to Patent Literature 1).

In golf play, it often happens that a ball is thrown more than 200 yards. When a ball stops on a fairway after having flown, it is possible to find the ball relatively easily. On the other hand, when a ball flies to a rough, it can be difficult to find the ball afterwards. In particular, when a ball flies into a deep rough or forest, it may be even difficult to determine the approximate position of the ball. To solve such problems, a technology that facilitates a search for a ball by generating an odor from a ball or generating light or sound from a ball has been proposed.

Patent Literature

[Patent Literature 1] Japanese Unexamined Patent Application, First Publication No. 2006-338336

SUMMARY OF THE INVENTION

However, it is often difficult to find a ball by an odor because a golf course is filled with odors of, for example, trees and grass. In addition, when a ball goes into a deep rough, it will be very difficult to detect the light and sound emitted from the ball. For this reason, it still remains unsolved how to find a golf ball.

In view of the above circumstances, an object of the present invention is to provide a technology capable of find a golf ball more easily.

According to one aspect of the present invention, a user terminal includes a communication device configured to receive radio waves transmitted from a wireless communication tag provided on a golf ball, an output device configured to output information to a user, and a controller configured to control the output device and output information according to radio waves received from the wireless communication tag provided on the golf ball.

In the user terminal according to one aspect of the present invention, the controller determines an output mode of the output device according to reception strength of the radio waves.

In the user terminal according to one aspect of the present invention, the wireless communication tag transmits radio waves using electric power generated by receiving radio waves transmitted from the communication device, the communication device is capable of outputting radio waves, and the controller determines a timing for outputting radio waves from the communication device according to reception strength of radio waves received from the wireless communication tag.

In the user terminal according to one aspect of the present invention, the controller determines an output mode of the output device according to reception strength of the radio waves, the wireless communication tag transmits radio waves using electric power generated by receiving radio waves transmitted from the communication device, the communication device is capable of outputting radio waves, and, the controller determines a timing for outputting radio waves from the communication device according to reception strength of radio waves received from the wireless communication tag.

In the user terminal according to one aspect of the present invention, radio waves output by the communication device are radio waves in a 2.4 GHz band.

According to another aspect of the present invention, a search system that includes a golf ball having a wireless communication tag for transmitting radio waves and a user terminal, in which the user terminal includes a communication device configured to receive radio waves transmitted from the wireless communication tag provided on the golf ball, an output device configured to output information to a user, and a controller configured to control the output device and output information according to radio waves received from the wireless communication tag provided on the golf ball.

According to the present invention, it is possible to find a golf ball more easily.

DETAILED DESCRIPTION OF THE INVENTION

Hereinafter, a specific configuration example of the present invention will be described with reference to the drawings.

Figure 1:
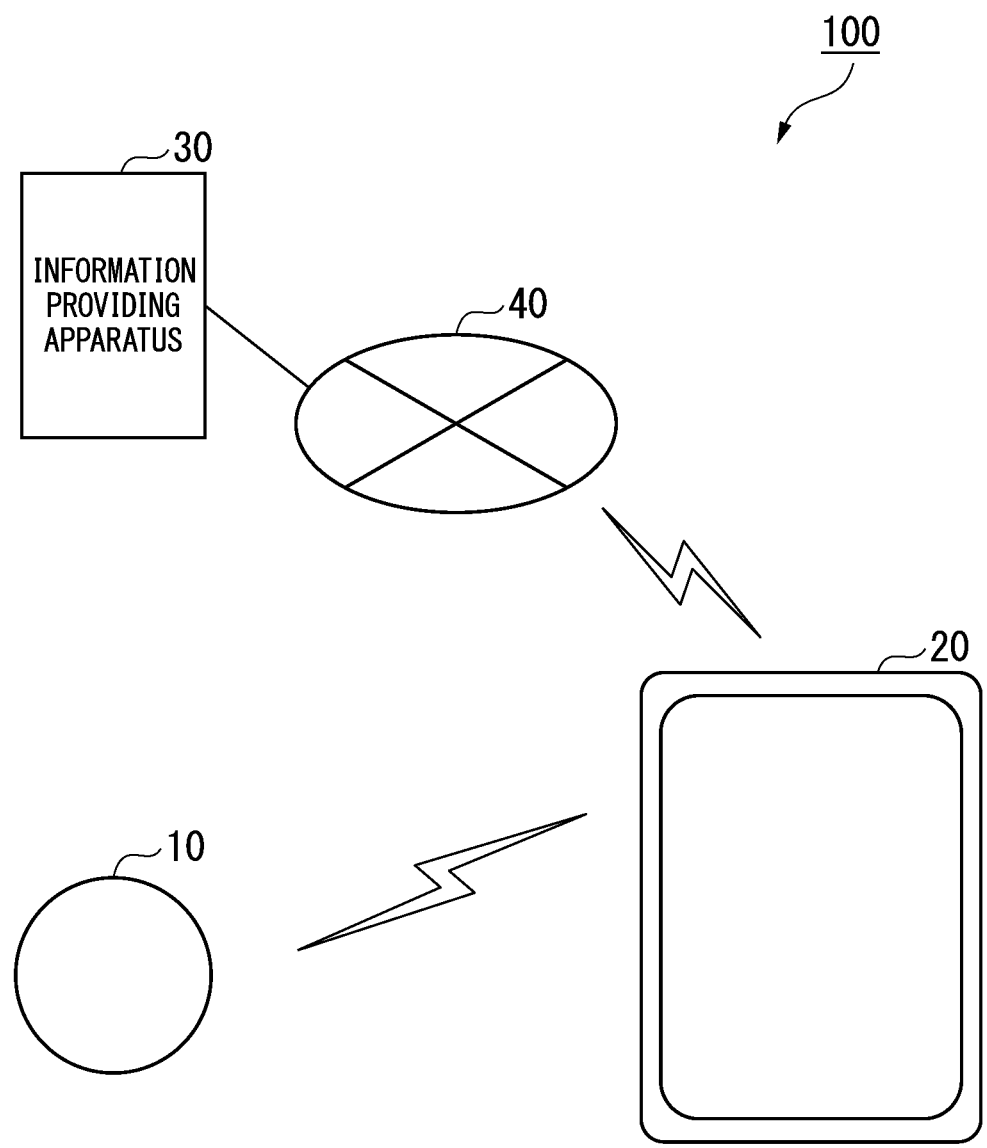
FIG. 1 is a schematic block diagram which shows a system configuration of a search system 100 of the present invention.

FIG. 1 is a schematic block diagram which shows a system configuration of a search system 100 of the present invention. The search system 100 includes a golf ball 10, a user terminal 20, and an information providing apparatus 30. The golf ball 10 and the user terminal 20 perform wireless communication with each other. The user terminal 20 and the information providing apparatus 30 communicate with each other via a network 40. The network 40 may be a network using wireless communication or a network using wired communication. The network 40 may be configured by combining a plurality of networks.

The golf ball 10 includes a wireless communication tag. The wireless communication tag may be attached to the outside of the golf ball 10 or may be embedded inside the golf ball 10. The wireless communication tag stores identification information assigned in advance. The wireless communication tag may be configured using, for example, a passive type IC tag or a radio frequency identification (RFID) tag. The wireless communication tag may be configured using, for example, a passive type Bluetooth (registered trademark) chip. In particular, by using a passive type tag or chip, the golf ball 10 does not need to include a battery, and safety and availability can be improved. When a passive type IC tag, an RFID tag, or a Bluetooth (registered trademark) chip is used, the wireless communication tag may transmit identification information by reflecting radio waves emitted from the user terminal 20. It is desirable that the identification information of the golf ball 10 be unique information. However, the identification information of the golf ball 10 may also be configured such that one of a plurality of candidate values is selected so that a probability of a golf ball 10 to which the same identification information is assigned being used in the same round has a very low value (for example, 1% or less). A wireless communication tag of the golf ball 10 transmits identification information to the user terminal 20 by performing wireless communication with the user terminal 20.

Figure 2:
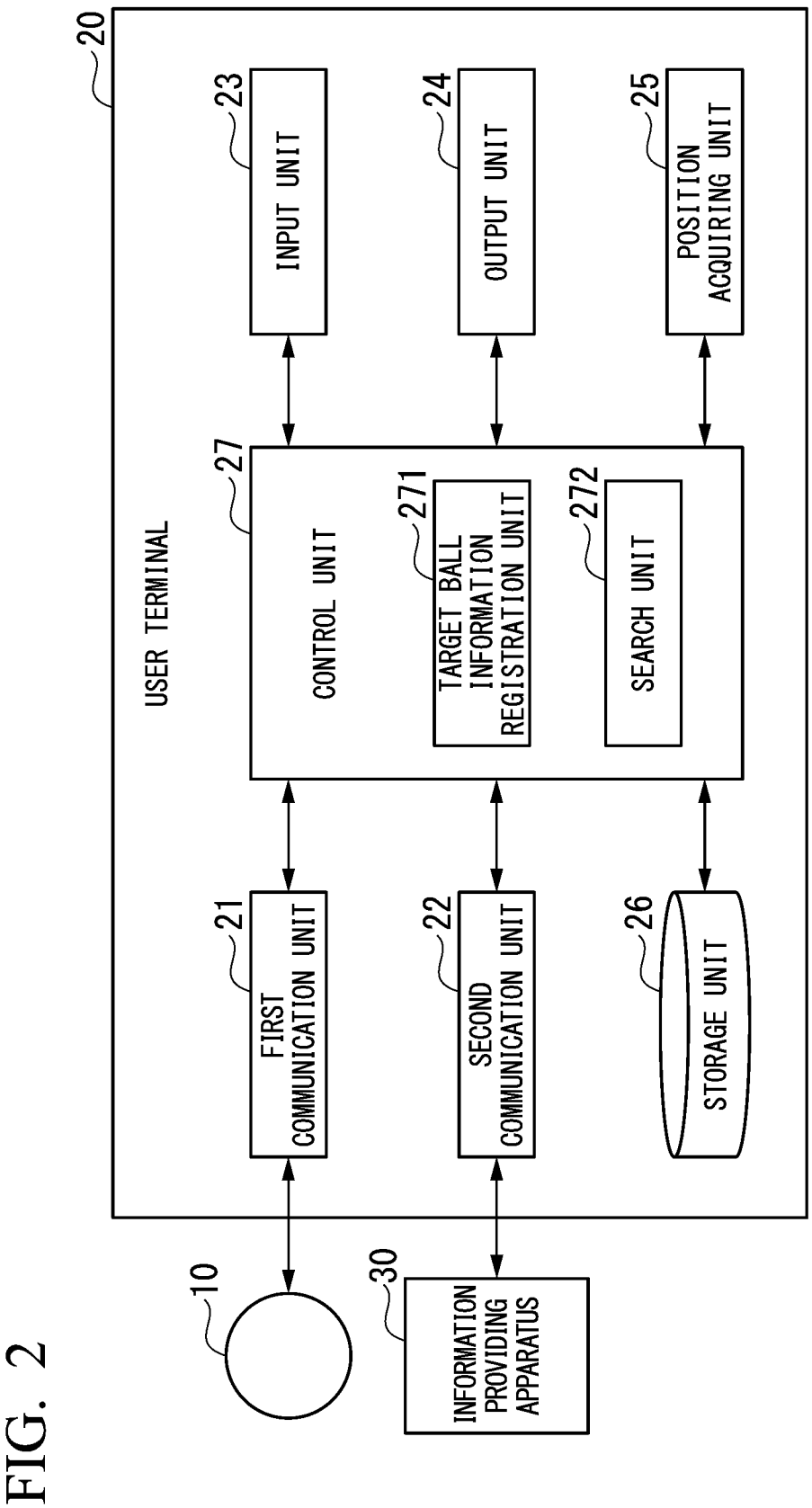
FIG. 2 is a schematic block diagram which shows a functional configuration of a user terminal 20.

The user terminal 20 is a device that performs wireless communication with the wireless communication tag of the golf ball 10. The user terminal 20 is a device whose weight and size are designed so that it can be carried by a user. The user terminal 20 may also be, for example, a portable information processing device such as a smartphone, a tablet device, or a wearable computer. As a specific example of a wearable computer, there is a device such as a smart watch or a smart glass. FIG. 2 is a schematic block diagram which shows a functional configuration of the user terminal 20. The user terminal 20 includes a first communication unit 21, a second communication unit 22, an input unit 23, an output unit 24, a position acquiring unit 25, a storage unit 26, and a control unit 27.

The first communication unit 21 is configured using a communication device. The first communication unit 21 performs wireless communication with the wireless communication tag of the golf ball 10. The first communication unit 21 outputs radio waves with a predetermined frequency according to, for example, a Bluetooth protocol. The first communication unit 21 outputs radio waves with a predetermined frequency according to, for example, an RFID protocol. The first communication unit 21 may be configured to output directional radio waves, or may be configured to output non-directional radio waves. When the wireless communication tag of the golf ball 10 is a passive type, the first communication unit 21 is configured using a device capable of communicating with the passive type wireless communication tag. The first communication unit 21 may perform communication using radio waves in a frequency band of, for example, 2.4 GHz. When the first communication unit 21 performs wireless communication with the golf ball 10 according to a Bluetooth protocol, it is desirable that pairing processing be performed between the golf ball 10 and the user terminal 20 before the golf ball 10 is hit.

The second communication unit 22 is configured using a communication device. The second communication unit 22 communicates with other communication devices and information processing devices via the network 40. The second communication unit 22 transmits or receives data to or from, for example, the information providing apparatus 30.

The input unit 23 is configured using existing input devices such as a keyboard, a pointing device (a mouse, a tablet, or the like), buttons, and a touch panel. The input unit 23 is operated by a user when an instruction of the user is input to the user terminal 20. The input unit 23 may be an interface for connecting an input device to the user terminal 20. In this case, the input unit 23 inputs an input signal generated in response to an input by the user in the input device to the user terminal 20.

The output unit 24 is configured using an output device that can provide a user with information. The output unit 24 may be configured using, for example, a lamp such as an LED. The output unit 24 may be configured using, for example, a speaker. The output unit 24 may be configured using, for example, an image display device such as a liquid crystal display or an organic electro-luminescent (EL) display. The output unit 24 may be configured using a device (a vibrator) that outputs vibrations. The output unit 24 may be configured using any device as long as it can provide a user with information.

The position acquiring unit 25 acquires positional information indicating a current position of the user terminal 20. The position acquiring unit 25 may be configured using, for example, a Global Positioning System (GPS) device. The position acquiring unit 25 may be configured to acquire positional information on the basis of, for example, a reception strength of signals received from a plurality of base stations of mobile communication, or the like. In this case, some functions of the position acquiring unit 25 may be implemented in the control unit 27.

The storage unit 26 is configured using a storage device such as a magnetic hard disk device or a semiconductor storage device. The storage unit 26 stores information required for processing by the control unit 27. The storage unit 26 stores, for example, a search target table. The search target table has one or more pieces of identification information registered by a user as the identification information of the golf ball 10 to be searched for.

Figures 3, 4:
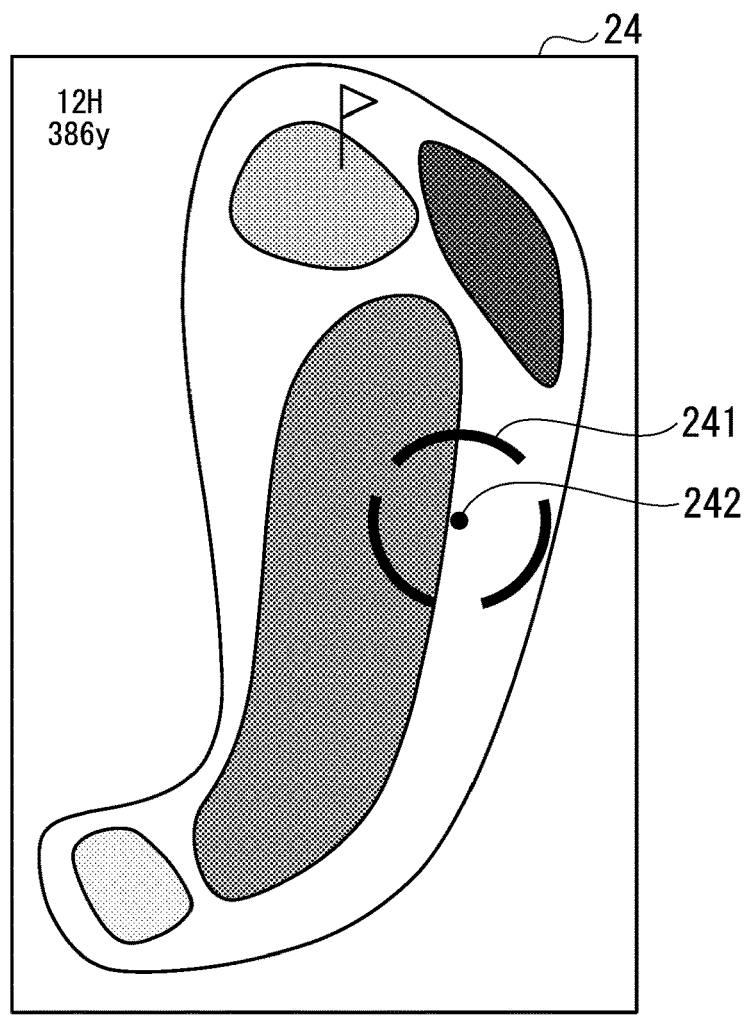
FIG. 3 is a diagram which shows a specific example of an output mode table.
FIG. 4 is a diagram which shows a display example in an output unit 24.

The storage unit 26 stores, for example, an output mode table. FIG. 3 is a diagram which shows a specific example of the output mode table. The output mode table has a plurality of output mode records 261. The output mode record 261 has values of reception strength and an output mode. Reception strength indicates reception strength of radio waves received from the golf ball 10 in the first communication unit 21. A value of reception strength in the output mode record 261 may also be information indicating a range of the value.

An output mode indicates an output mode performed by the output unit 24 when the reception strength in the first communication unit 21 is within a range of the value of the reception strength in the output mode record 261. The output mode is defined as an output mode in which a higher value of the reception strength in the first communication unit 21 indicates that a ball is closer.

For example, the output mode may indicate a volume to be output when the output unit 24 is a speaker. In this case, the output mode table may be defined so that a sound with a larger volume is output as the value of the reception strength is higher. The output mode may indicate a pitch to be output when the output unit 24 is a speaker. In this case, the output mode table may be defined so that a sound with a higher pitch is output as the value of the reception strength is higher. However, an output pitch is a pitch that can be sufficiently heard by a human ear. The output mode may indicate a type of voice to be output when the output unit 24 is a speaker. For example, a voice indicating a degree of a distance to a ball may be output according to the value of the reception strength. For example, a human voice saying "the ball is very close" is output when the value of the reception strength is in a highest range, a human voice saying "the ball is nearby" is output when the value of the reception strength is in an intermediate range, a human voice saying "the ball might be nearby" is output when the value of the reception strength is in a low range, and a human voice saying "the ball is not nearby" is output when the value of the reception strength is in a lowest range. The output mode may indicate an image display mode when the output unit 24 is configured using an image display device. For example, a size of an image of a ball may be changed and displayed according to the value of the reception strength.

The output mode may indicate a brightness of light output from a lamp when the output unit 24 is the lamp. In this case, the output mode table may be defined so that brighter light is output as the value of the reception strength is higher. The output mode may indicate the number of lamps to be lit when the output unit 24 is a plurality of lamps. In this case, the output mode table may be defined so that more lamps are lit as the value of the reception strength is higher. The output mode may indicate positions of the lamps to be lit when the output unit 24 is a plurality of lamps. In this case, the output mode table may be defined so that a lamp indicating that a ball is closer is lit as the value of the reception strength is higher. The examples of the output mode table described above are merely specific examples. The output mode table may be defined in any manner.

Returning to description of FIG. 2, the control unit 27 is configured using a processor such as a CPU and a memory. The control unit 27 functions as a target ball information registration unit 271 and a search unit 272 when a processor executes a program. All or some functions of the control unit 27 may be realized using hardware such as an application specific integrated circuit (ASIC), a programmable logic device (PLD), or a field programmable gate array (FPGA). The program described above may be recorded in a computer-readable recording medium. A computer-readable recording medium is a portable medium such as a flexible disk, a magneto-optical disc, a ROM, a CD-ROM, or a semiconductor storage device (for example, a solid state drive (SSD)), or a storage device such as a hard disk or a semiconductor storage device embedded in a computer system. The program described above may be transmitted via an electric telecommunication line.

The target ball information registration unit 271 registers identification information of the wireless communication tag of the golf ball 10 in a search target table according to an operation of a user. For example, the target ball information registration unit 271 is in a state of receiving an input of an identification target to be registered (hereinafter referred to as a "registration state") in response to a predetermined registration operation being performed on the input unit 23. The target ball information registration unit 271 may receive identification information from the wireless communication tag of the golf ball 10 positioned at a communicable distance by operating the first communication unit 21 in such a registration state. In the registration state, the target ball information registration unit 271 may set strength of radio waves output from the first communication unit 21 to a lower strength than that in a search state. With this configuration, identification information can be received only from the wireless communication tag of a golf ball 10 that a user intends to register, and it is possible to prevent identification information from being received from the wireless communication tag of a golf ball 10 that a user does not intend and being registered by mistake. The target ball information registration unit 271 registers the identification information received during the registration state in the search target table. Processing of registering the identification information of the wireless communication tag in the search target table in this manner may be implemented as Bluetooth pairing. In this case, the registration state described above may also be implemented as a Bluetooth pairing connection standby state.

The search unit 272 searches for the golf ball 10 in response to the operation of a user. For example, when a predetermined start operation is performed on the input unit 23, the search unit 272 then shifts to a state of performing a search (hereinafter referred to as a "search state") and starts a search. In the search state, the search unit 272 receives identification information from the wireless communication tag of a golf ball 10 positioned at a communicable distance by operating the first communication unit 21. When radio waves containing the identification information are received, the search unit 272 determines an output mode according to the reception strength of the received radio waves on the basis of the output mode table. The search unit 272 operates the output unit 24 according to the determined output mode.

When identification information is registered in the search target table, the search unit 272 operates the output unit 24 only when radio waves containing the identification information registered in the search target table are received. With this configuration, even in a situation in which there are many golf balls around, it is possible to search only for a golf ball 10 registered in the search target table in advance, and it is possible to find a desired golf ball 10 more easily.

The search unit 272 estimates the position of a golf ball 10 on the basis of the reception strength of radio waves and positional information acquired by the position acquiring unit 25. For example, a region inside a circle having a radius corresponding to the reception strength may be estimated as a position at which a golf ball 10 is positioned, depending on the positional information acquired by the position acquiring unit 25. For example, the search unit 272 may estimate a region included in all of the estimated regions at a plurality of positions as a position at which a golf ball 10 is positioned. The search unit 272 outputs information indicating a result of the estimation via the output unit 24. For example, the search unit 272 may receive map information from the information providing apparatus 30 that provides the map information, and cause the output unit 24 to display a screen on which the position of the estimation result is superimposed on the map information.

FIG. 4 is a diagram which shows a display example in the output unit 24. In the example of FIG. 4, the output unit 24 displays a map of a hole (a 12th hole) of a golf course where the user terminal 20 is positioned, a frame 241 indicating an estimated position (region), and a point 242 indicating the position of the user terminal 20. In the example of FIG. 4, the frame 241 is circular, but it does not necessarily have to be circular. As described above, when a region included in all of the estimated regions at a plurality of positions is estimated as the position of a golf ball 10, a frame 241 indicating a shape of the region is displayed.

The information providing apparatus 30 is configured using an information processing device such as a server or a personal computer. The information providing apparatus 30 is configured to be able to communicate with other information processing devices via the network 40. The information providing apparatus 30 provides a service related to a search using the user terminal 20. For example, the information providing apparatus 30 may be configured to perform authentication processing or on-line activation to enable the user terminal 20 or an application running on the user terminal 20. The information providing apparatus 30 may perform, for example, processing for realizing cooperation with another application that provides a map of a golf course. In response to such cooperation, the information providing apparatus 30 may provide the user terminal 20 with information indicating the map of the golf course.

Figure 5:
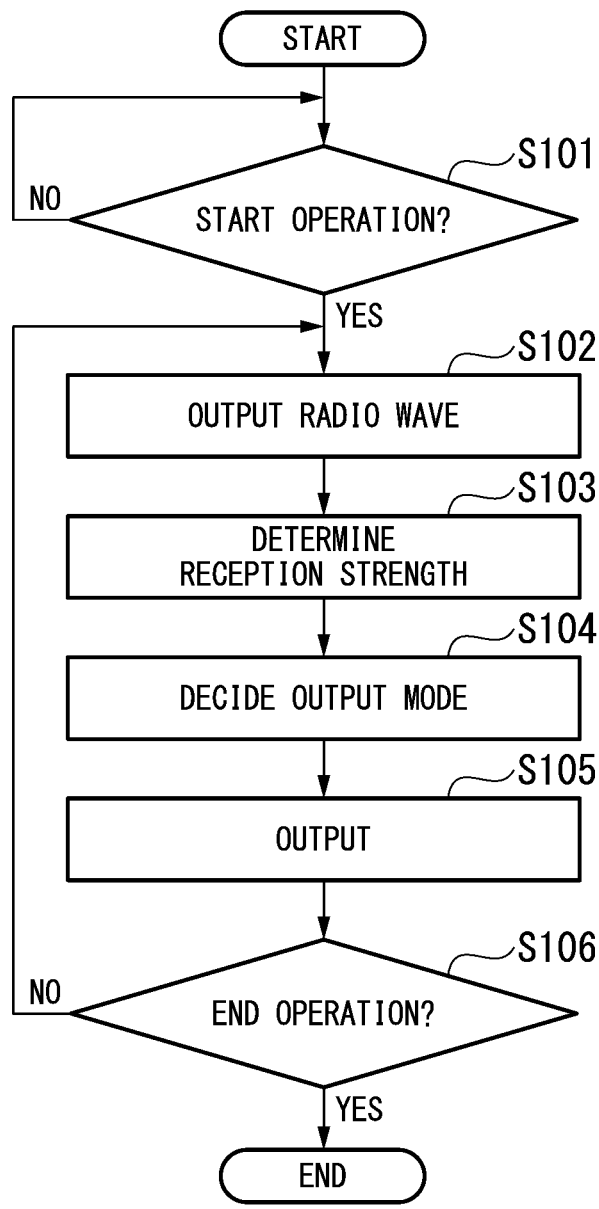
FIG. 5 is a flowchart which shows a specific example of a flow of an operation of the user terminal 20.

FIG. 5 is a flowchart which shows a specific example of a flow of the operation of the user terminal 20. The control unit 27 waits without outputting radio waves from the first communication unit 21 until a predetermined start operation is performed on the input unit 23 by a user (NO in step S101). When a user performs a predetermined start operation on the input unit 23 (YES in step S101), the control unit 27 causes radio waves to be output from the first communication unit 21 (step 102). Upon receiving the radio waves transmitted from the wireless communication tag of the golf ball 10, the control unit 27 determines the reception strength of the received radio waves (step S103). The control unit 27 determines an output mode according to a result of determining the reception strength (step S104). The control unit 27 controls the output unit 24 in the determined output mode and performs an output (step S105). Thereafter, the control unit 27 repeatedly executes processing of steps S102 to S105 at a predetermined cycle until an end operation is performed (NO in step S106). When the end operation is performed (YES in step S106), the control unit 27 ends the processing in the search state.

The control unit 27 may be configured to perform the processing of step S105 only when a radio wave containing predetermined identification information is received. The predetermined identification information may be identification information in a predetermined format (for example, identification information in which a predetermined character string is included in first n characters) that is used in advance for the identification information of the wireless communication tag of the golf ball 10. The control unit 27 may be configured to perform the processing of step S105 only when a radio wave containing identification information registered in the search target table is received.

In the search system 100 configured in this manner, the output unit 24 of the user terminal 20 operates in response to communication with the wireless communication tag assigned in advance to the golf ball 10. For this reason, a user can easily estimate the position of an invisible golf ball 10 on the basis of an output of the output unit 24. As a result, the golf ball 10 can be found in a shorter time. As a result, it is possible to reduce an anxiety of a user that the golf ball 10 cannot be found or his or her own golf ball 10 can be found by asking someone else to find it, and it is possible to improve a mental state of a user who plays a golf play.

In addition, in the search system 100 configured in this manner, a general-purpose user terminal 20 may be used instead of a dedicated device as a device for searching the golf ball 10. Specifically, the golf ball 10 can be searched for using a device such as a smartphone or a wearable computer usually carried by a user. For this reason, a burden on the user can be reduced and the convenience can be improved as compared with a case in which a dedicated device is used.

MODIFIED EXAMPLE

The search unit 272 may be configured to variably control an output cycle of radio waves by the first communication unit 21 according to the reception strength. For example, the output cycle of the radio waves by the first communication unit 21 may be controlled so that it becomes longer as the reception strength is higher. With this configuration, in a state in which an approximate position of the golf ball 10 is not known yet (a state in which the reception strength is zero), it is possible to find out the approximate position at a timing as early as possible by outputting radio waves in a relatively short cycle. On the other hand, when the radio waves from the golf ball 10 to be searched for has already been received with a high reception strength, the position is almost in sight, so even if the radio waves are output in a relatively long cycle, a user can sufficiently find the golf ball 10. Moreover, it is possible to suppress power consumption by outputting radio waves in a relatively long cycle.

The search system 100 may be configured as a system including a golf ball 10 and a user terminal 20.

The user terminal 20 may be configured only in one pattern of an output mode without changing the output mode. Even when the user terminal 20 configured in this manner is used, it is possible to find the golf ball 10 more easily than ever before.

A part or all of the processing performed by the control unit 27 of the user terminal 20 may be performed by the information providing apparatus 30. In this case, the user terminal 20 may be configured such that information such as reception strength is transmitted to the information providing apparatus 30, and the user terminal 20 receives a result of processing in the information providing apparatus 30.

Figure 6:
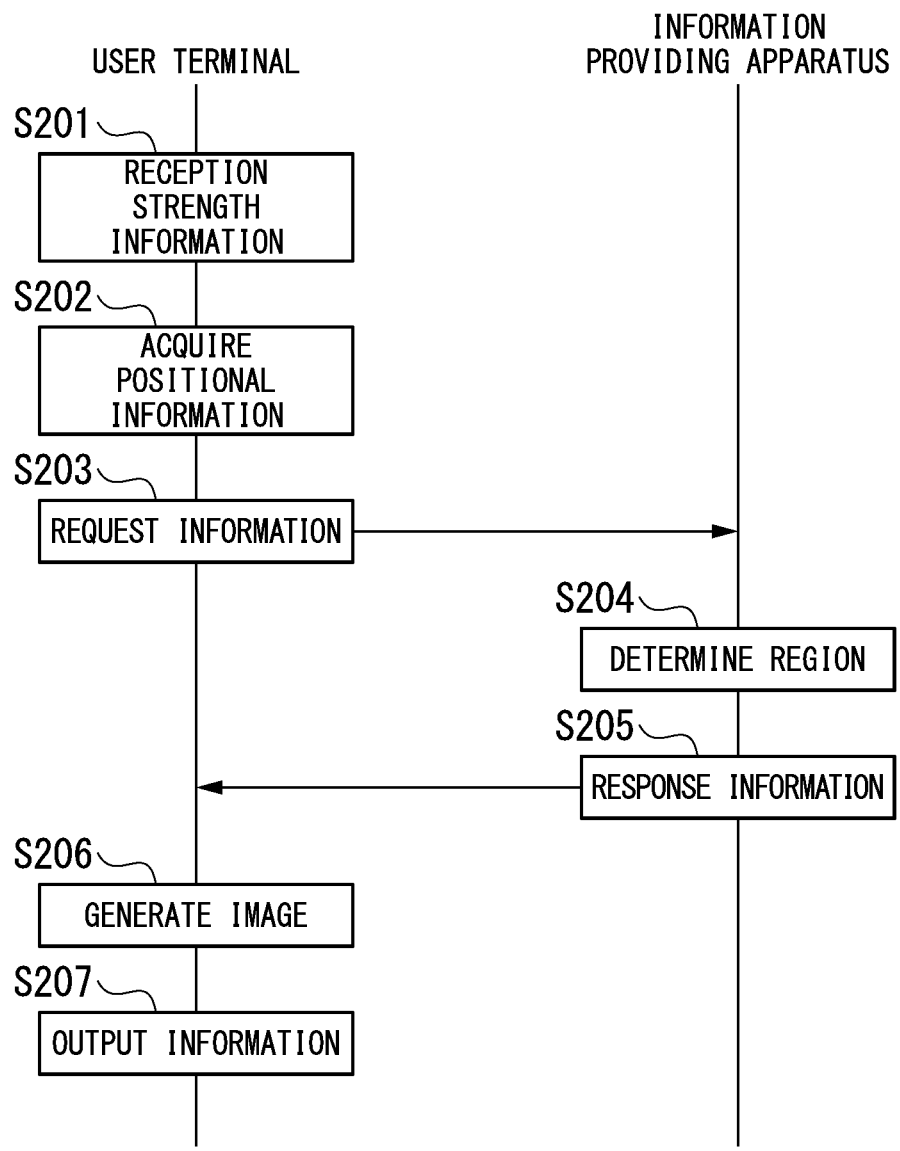
FIG. 6 is a sequence chart showing the case in which the user terminal 20 and an information providing apparatus 30 operate in cooperation.

FIG. 6 is a sequence chart showing the case in which a part of the processing performed by the control unit 27 of the user terminal 20 is performed by the information providing apparatus 30. In the example of FIG. 6, the position of the golf ball 10 is estimated by the information providing apparatus 30 instead of the user terminal 20.

When the reception strength is obtained, the user terminal 20 generates data (reception strength information) indicating the reception strength. The user terminal 20 acquires the positional information thereof (step S202). The user terminal 20 generates request information including reception strength information and positional information. Then, the user terminal 20 transmits the request information to the information providing apparatus 30 (step S203).

When the information providing apparatus 30 receives the request information, it estimates the position of the golf ball 10 on the basis of the positional information and the reception strength included in the request information (step S204). At this time, the position of the golf ball 10 may be estimated as a region. The information providing apparatus 30 generates response information including an image of the hole of a golf course in which the user terminal 20 is positioned and a result of estimating the position of the golf ball 10. Then, the information providing apparatus 30 transmits the response information to the user terminal 20 (step S205).

When the user terminal 20 receives the response information, it generates an image showing the position of the golf ball 10 on the basis of the image and the estimation result included in the response information (step S206). Then, the user terminal 20 displays the generated image on the output unit 24 (step S207).

The golf ball 10 may include one or more sensors. For example, the golf ball 10 may include a weight sensor. When a pressure is measured by the weight sensor, a result of the measurement is transmitted to the user terminal 20 by wireless communication. When the user terminal 20 receives the result of the measurement via the first communication unit 21, the user terminal 20 counts the number of strokes in golf according to a result of the reception. For example, when the result of the measurement by the weight sensor exceeds a predetermined threshold value due to an impact generated at the time of a shot, the search unit 272 of the user terminal 20 counts the number of strokes assuming that there was one shot, and counts a score. In this case, another device (for example, a golf-related device) linked with the user terminal 20 may correct erroneous detection information. Moreover, the search unit 272 may record a score of an entire play on the basis of putt information recorded by other devices.

The search unit 272 of the user terminal 20 may determine information indicating strength of a shot or swing on the basis of the result of the measurement by the weight sensor. The search unit 272 may output a result of the determination to the output unit 24. A user can determine whether each swing is good or bad on the basis of this result. Generally, when a flying club such as a driver is used, it is better to have a larger value. The search unit 272 may record and display the highest value of the score of the user in a ranking format.

The golf ball 10 may include an acceleration sensor. The search unit 272 of the user terminal 20 may determine a movement of the golf ball 10 on the basis of a result of the measurement by the acceleration sensor. For example, the search unit 272 may determine the number of revolutions of the golf ball 10 on the basis of the result of the measurement by the acceleration sensor.

The golf ball 10 may include a memory in a micro controller unit (MCU). The memory may record the result of the measurement by the sensor.

The search unit 272 may output various types of information obtained on the basis of the result of the measurement by the sensor using the output unit 24. For example, elements of a flying distance of a golf ball are a "ball initial speed," a "hitting angle," and a "backspin," but the three elements described above may be recorded at the time of swing and differences from ideal values may also be output. For example, according to one theory, it is better to have a faster ball initial speed, it is said that a value of about 12 to 14 degrees is appropriate for a hitting angle, and it is said that a backspin of 2200 to 2500 rotations is appropriate. The differences from such ideal values may be output. Moreover, in order to suppress excessive bending to the left and right, it may be determined whether the number of lateral rotations is 500 times or less and a result of the determination may be output to a user.

The user terminal 20 may be configured to receive an input of a user and register it whenever a ball is found. With such a configuration, the number of ball strokes can be easily counted after play.

The search unit 272 of the user terminal 20 may count the number of times Bluetooth pairing has been performed with an identical golf ball 10. The search unit 272 may treat a result of this counting as the number of strokes. For example, the search unit 272 may also determine a result of the counting until a pairing with one golf ball 10 is performed and a pairing with another golf ball 10 is performed as the number of strokes until the golf ball 10 is lost. The search unit 272 may calculate a statistical value such as an average value of the number of strokes until the golf ball is lost.

Although embodiments of the present invention have been described in detail with reference to the drawings, a specific configuration is not limited to these embodiments, and includes designs and the like within a range not departing from the gist of the present invention.

The present invention can be used as a technology for searching for a golf ball.

EXPLANATION OF REFERENCES

100 Search system
10 Golf ball
20 User terminal
21 First communication unit
22 Second communication unit
23 Input unit
24 Output unit
25 Position acquiring unit
26 Storage unit
27 Control unit
271 Target ball information registration unit
272 Search unit
30 Information providing apparatus
40 Network

What is claimed is:

1. A user terminal comprising:
a memory; and
a processor connected to the memory, the processor being configured to:
transmit first radio waves to a wireless communication tag provided on or in a golf ball;
receive second radio waves transmitted, according to the first radio waves, from the wireless communication tag;
output, to a user, information according to the second radio waves; and
acquire positional information indicating a current position of the user terminal,
wherein, in case of a registration state of the golf ball, the processor is configured to set strength of the first radio waves to a lower strength than that in a search state of the golf ball, and
the processor is configured to
estimate, in the search state, a plurality of regions where the golf ball registered may be positioned based on reception strength of the second radio waves received and the positional information acquired, and
estimate a region included in all of the plurality of regions as a region where the golf ball registered is positioned.

2. The user terminal according to claim 1, wherein the processor is configured to determine an output mode of the user terminal according to reception strength of the second radio waves.

3. The user terminal according to claim 1,
wherein the wireless communication tag transmits the second radio waves using electric power generated by receiving the first radio waves,
the processor is capable of outputting third radio waves, and
the processor is configured to determine a timing for outputting the third radio waves from the user terminal according to reception strength of the second radio waves received from the wireless communication tag.

4. The user terminal according to claim 3, wherein the third radio waves are radio waves in a 2.4 GHz band.

5. The user terminal according to claim 1,
wherein the processor is configured to determine an output mode of the user terminal according to reception strength of the second radio waves, the wireless communication tag transmits the second radio waves using electric power generated by receiving the first radio waves transmitted from the user terminal, the user terminal is capable of outputting third radio waves, and the processor is configured to determine a timing for outputting the third radio waves from the user terminal according to reception strength of the second radio waves received from the wireless communication tag.

6. The user terminal according to claim 5, wherein the third radio waves are radio waves in a 2.4 GHz band.

7. A search system that comprises a golf ball having a wireless communication tag and a user terminal, wherein the user terminal comprises:

a memory; and a processor connected to the memory, the processor being configured to:

transmit first radio waves to the wireless communication tag provided on or in the golf ball;

receive second radio waves transmitted, according to the first radio waves, from the wireless communication tag;

output, to a user, information according to the second radio waves; and acquire positional information indicating a current position of the user terminal, wherein, in case of a registration state of the golf ball, the processor is configured to set strength of the first radio waves to a lower strength than that in a search state of the golf ball, and the processor is configured to estimate, in the search state, a plurality of regions where the golf ball registered may be positioned based on reception strength of the second radio wave received and the positional information acquired, and estimate a region included in all of the plurality of regions as a region where the golf ball registered is positioned.

8. The user terminal according to claim 1, the processor being further configured to:

store, in the memory, one or plurality of identification information of one or plurality of golf ball, the one or plurality of identification information being search target, the one or plurality of identification information being registered by the user; and output the one or plurality of identification information in case only that radio wave including the one or plurality of identification information stored in the memory is received.

* * * * *